Nov. 25, 1969  W. H. KUMM  3,479,870
OCEANOGRAPHIC APPARATUS
Filed Nov. 29, 1967  2 Sheets-Sheet 2
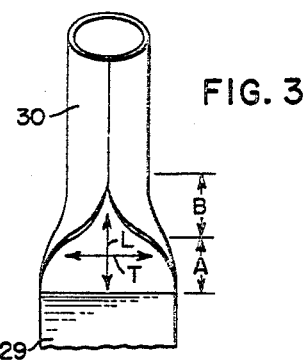
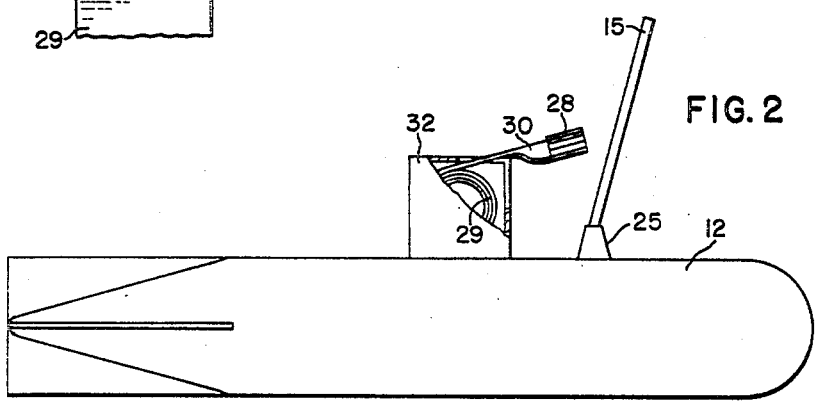
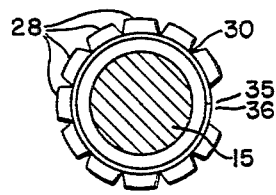
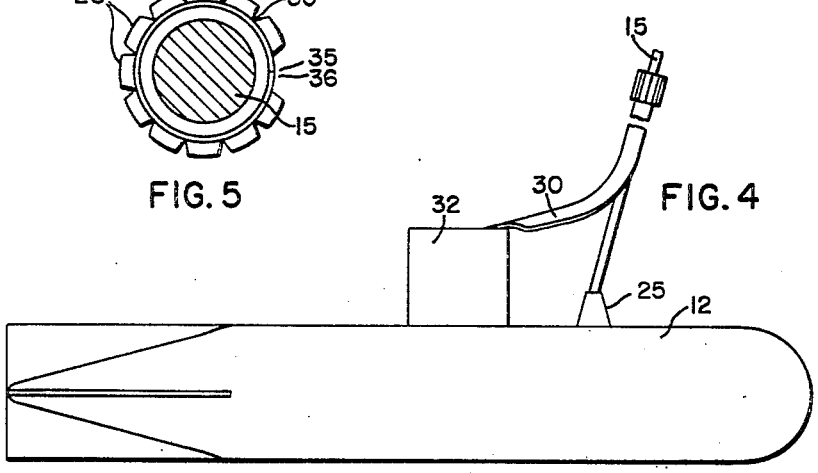
INVENTOR
William H. Kumm
BY Dean Schron
ATTORNEY

United States Patent Office 3,479,870
Patented Nov. 25, 1969

3,479,870
OCEANOGRAPHIC APPARATUS
William H. Kumm, Severna Park, Md., assignor to Westinghouse Electric Corporation, Pittsburgh, Pa., a corporation of Pennsylvania
Filed Nov. 29, 1967, Ser. No. 686,553
Int. Cl. G01w 1/08
U.S. Cl. 73—170    3 Claims

ABSTRACT OF THE DISCLOSURE

A towed underwater vessel carries instrumentation for obtaining or measuring oceanographic parameters. The vessel includes a dispenser which contains a coilable tube in the form of a strip of resilient material which when unrolled from its coil curves transversely upon itself to assume a cylindrical shape. Carried at the free end of the extended strip is instrumentation which must be positioned at a distance from the towed vessel. The dispenser is located adjacent the tow cable so that when the strip is extended it contacts and curves around the tow cable for substantially the entire distance of the unrolled strip.

BACKGROUND OF THE INVENTION

Field of the invention

This invention in general relates to underwater oceanographic instrumentation vessels or platforms, and particularly to a towed vessel and mechanism for positioning instrumentation at a distance from the towed vessel.

Description of the prior art

In obtaining underwater data by means of instrumentation carried by an underwater vessel it is sometimes desired that the instrumentation be positioned at a distance from the vessel.

For obtaining exact vessel position, there is often utilized a system including a plurality of transponders located at known positions on or above the sea bottom. In order to transmit signals to and receive signals from these transponders there is a transponder interrogator associated with the towed vessel and it becomes necessary to position the transponder interrogator at a distance of for example 100 feet or more from the vessel.

If for remote positioning, the transponder interrogator, or other instrumentation is attached to the cable towing the vessel, then the instrumentation will foul or be destroyed on a retrieval mechanism when the towed vessel is brought up onto or into a towing ship.

It is a general object therefore to provide oceanographic apparatus wherein a towed vessel carries various instrumentation together with means for positioning that instrumentation at a point remote from the vessel.

SUMMARY OF THE INVENTION

Oceanographic apparatus includes first and second spatially disposed oceanographic bodies with a cable means connected between the bodies. One of the bodies includes a dispenser having a roll of extendable strip of the type which, when unrolled longitudinally assumes a transverse curvature. The dispenser is located relative to the cable means such that when the extendable strip is unrolled it contacts and curves around the cable means. Instrumentation means located at the free end of the extendable strip may thereby be positioned a point remote from the body while the cable means provides the necessary longitudinal rigidity.

BRIEF DESCRIPTION OF THE DRAWINGS

FIG. 2 illustrates an embodiment of the invention in one position of operation;

FIG. 3 illustrates the extendable strip utilized in the practice of the invention;

FIG. 4 illustrates an embodiment of the invention in a second position of operation; and FIG. 5 illustrates a cross-section through the instrument carrying free end of the extendable strip.

DESCRIPTION OF THE PREFERRED EMBODIMENT

Figure 1:
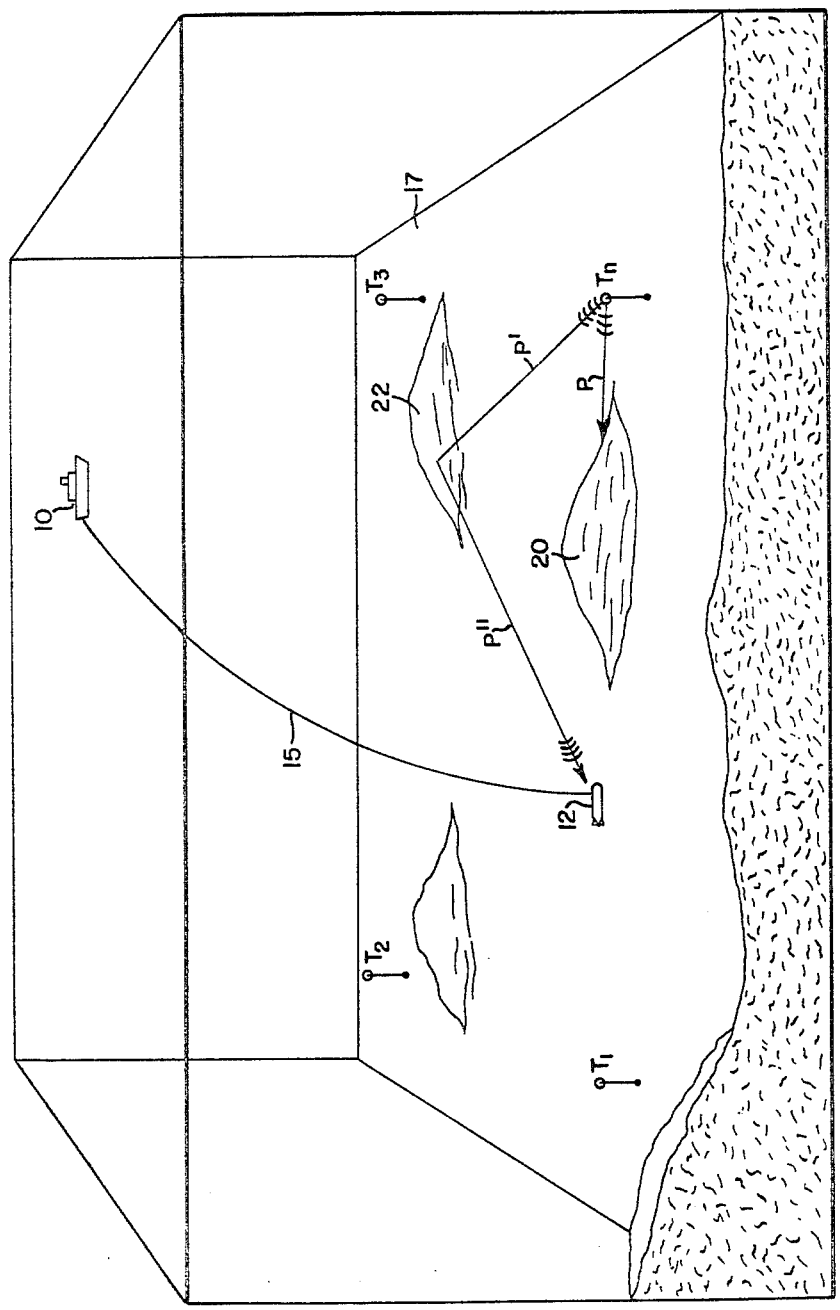
FIGURE 1 illustrates, in perspective view, a section of the ocean illustrating a problem which the present invention overcomes.

The situation depicted in FIGURE 1 includes a first oceanographic body in the form of a tow vessel 10, a second oceanographic body in the form of a towed vessel 12 with cable means such as a tow cable 15 connected between the two vessels. The vessel 12 contains instrumentation for obtaining underwater data and it is necessary to know the exact navigational position of the vessel in order to correlate the data obtained.

The system for obtaining navigational position includes a plurality of transponders $T_1$, $T_2$, $T_3$ . . . $T_n$ placed at known locations above the sea bottom 17.

Each of the transponders $T_1$ to $T_n$ transmits an individually characteristic frequency, or other identifying signal, in response to a received acoustic signal, commonly called an interrogate signal. The interrogate signal is transmitted by a transponder interrogator associated with the towed vessel 12 and the distance to the respective transponders may be determined by calculating the time required to receive the specific transponder signals, after the transmission of an interrogate signal.

If, as depicted in FIGURE 1, an underwater obstruction 20 is in the path P of the signal from transponder $T_n$, then the receiving means, which may be transponder interrogator on the towed vessel 12 will not receive the signal on the direct path P. A reflected transponder signal may be received at the towed vessel 12 by virtue of the signal being reflected by another underwater obstacle 22 such that the signal travels the path indicated by P' and P'' and will be misinterpreted by the apparatus for determining navigational position to mean that the transponder $T_n$ is located at a distance of P' plus P'' along a straight line path. It is therefore advantageous that the transponder interrogator be disposed at a substantial distance above the towed vessel to receive acoustic signals along a direct line of sight from the respective transponders, and to this end reference is now made to FIGURE 2.

In FIGURE 2 the tow cable 15 is connected to the towed vessel 12 at a point of attachment 25 in any one of a number of well known manners. The vessel 12 may carry various instrumentation such as for measurement of water temperature, density, salinity, and other instrumentation such as cameras, TV equipment, side looking and other types of Sonar. Other instrumentation means such as a transponder interrogator 28 is associated with the vessel 12 with the further requirement that during normal operation such instrumentation means must be positioned at a point remote from the vessel 12. In order to accomplish this positioning there is provided a roll of extendable strip 30 carried by the vessel and being of the type which when unrolled longitudinally by means of, for example, dispenser means 32, assumes a transverse curvature, better illustrated in FIGURE 3 to which reference is now made.

In FIGURE 3 the extendable strip 30 has a longitudinal axis indicated by the arrow L and a transverse axis indicated by the arrow T. The strip 30 is of a metal, such as a phosphor bronze, which is initially fabricated such that the strip may be flat while coiled and assume a transverse curvature when unrolled and extended. The strip 30 remains flat for a short distance A as it comes off the coil 29, after which distance A the strip tends to assume a transverse curvature for a distance B and thereafter assumes its tubular shape. Although not illustrated, the dispensing means 32 may include suitable drive motors and rollers for properly extending the strip 30.

In FIGURE 4 there is illustrated the apparatus in another position of operation, the extended position. The dispenser means 32 and accordingly the roll of extendable strip 30 is positioned relative to the point of attachment 25 and the tow cable 15 such that when the strip is unrolled contact is made with, and the strip 30 curves around the cable 15.

With the extendable strip 30 curved around the cable 15 it is provided with sufficient longitudinal rigidity that the instrumentation means such as the transponder interrogator 28 is positioned at the free end of the extendable strip 30 may be positioned up the cable 15 at a point which is 100 or more feet above the towed vessel 12. FIGURE 5 is a cross-sectional view along the line V—V and illustrates the curvature of the extendable strip 30 around the tow cable 15. Attached to the extendable strip 30 is a transponder interrogator means 28.

The curvature of the extendable strip 30 may be governed in the manufacturing process thereof such that the side edges 35 and 36 extend almost around the tow cable 15, or abut one another completely encircling the tow cable 15, or overlap one another.

The apparatus has been described with respect to an underwater towed vessel. It is apparent that the dispenser means 32 could be located on the towing vessel whereby the extendable strip would extend down the tow cable 15 for placement of instrumentation at a point remote from the towing vessel. Obviously other embodiments are suggested such as an underwater oceanographic platform connected by cable means to a surface or subsurface buoy and wherein the cable means connected to the buoy would be utilized by the extendable strip for providing the necessary longitudinal rigidity required of the apparatus.

Although the present invention has been described with a certain degree of particularly, it should be understood that the present disclosure has been made by way of example and that modifications and variations other than those mentioned are made possible in the light of the above teachings.

I claim as my invention:
1. Oceanographic apparatus comprising:
   (a) first and second spatially disposed oceanographic bodies;
   (b) cable means connected between said bodies;
   (c) a roll of extendable strip carried by one of said bodies and being of the type which, when unrolled longitudinally, assumes a traverse curvature;
   (d) said roll being positioned relative to said cable means so that when said extendable strip is unrolled, contact is made with, and said extendable strip curves around said cable means; and
   (e) instrumentation means carried by said extendable strip at the free end thereof.
2. Apparatus according to claim 1 wherein:
   (a) the first oceanographic body is a tow vessel;
   (b) the second oceanographic body is a towed vessel; and
   (c) the cable means is a tow cable.
3. Underwater apparatus comprising:
   (a) an underwater body including a point of attachment;
   (b) a tow cable connected to said point of attachment;
   (c) a roll of extendable strip carried by said underwater body being and of the type which, when unrolled longitudinally, assumes a transverse curvature;
   (d) said roll being positioned relative to said tow cable that when said extendable strip is unrolled, contact is made with, and said extendable strip curves around, said tow cable.

References Cited

UNITED STATES PATENTS 3,243,132   3/1966   Taylor et al.
3,314,009   4/1967   Murdock.

RICHARD C. QUEISSER, Primary Examiner

JERRY V. MYRACLE, Assistant Examiner

U.S. Cl. X.R.

242—55